United States Patent [19]

Lepley

[11] Patent Number: 4,957,404

[45] Date of Patent: Sep. 18, 1990

[54] FLAIL CHAIN UNLOADER FOR PARTICULATE MATERIAL

[75] Inventor: James W. Lepley, Smithville, Ohio

[73] Assignee: Flying Dutchman, Inc., Smithville, Ohio

[21] Appl. No.: 384,413

[22] Filed: Jul. 24, 1989

[51] Int. Cl.[5] .............................................. B65G 65/46

[52] U.S. Cl. .................................... 414/324; 414/301; 414/306; 222/228; 222/240; 366/607; 366/293

[58] Field of Search ............... 414/297, 298, 299, 301, 414/324; 222/227, 228, 240, 310; 366/607, 308, 293

[56] References Cited

U.S. PATENT DOCUMENTS

| | | | |
|---|---|---|---|
| 3,138,300 | 6/1964 | Rintala | 414/324 |
| 3,710,960 | 1/1973 | Stauffer et al. | 414/324 |
| 3,710,986 | 1/1973 | Lepley | 414/324 X |
| 3,828,946 | 8/1974 | Lepley | 414/324 |
| 3,828,947 | 8/1974 | Lepley | 414/324 |
| 3,837,507 | 9/1974 | Lepley et al. | 414/324 |
| 3,907,131 | 9/1975 | Lepley | 414/324 |
| 4,079,848 | 3/1978 | Lepley | 414/324 |

*Primary Examiner*—Joseph J. Rolla
*Assistant Examiner*—Keith L. Dixon
*Attorney, Agent, or Firm*—Mason, Kolehmainen, Rathburn & Wyss

[57] ABSTRACT

A flail chain unloader for discharging particulate material from a lower output of an upright storage vessel includes a rotating shaft extending upwardly of the central portion of the vessel above the outlet and flail chains secured to the shaft at different levels thereon to rotate with the shaft and loosen the particulate materials in the vessel to flow downwardly for discharge through the lower outlet. One or more upper flail chains are secured adjacent an upper level portion of the shaft and have outer ends movable in a generally circular path closely adjacent the inside wall surface of the vessel for loosening the material adjacent the vessel wall. At least one set of intermediate flail chains of a relatively short length is provided at spaced apart lower levels below the upper flail chains in order to dig out the material in the central portion of the vessel around the shaft. These short length chains are designed to minimize entanglement with the upper longer flail chains when the unloader is starting up from rest and the chains are hanging downwardly around the shaft before sufficient centrifugal force is attained for the chains to swing outwardly toward a horizontal orbit around the vessel.

18 Claims, 4 Drawing Sheets

FLAIL CHAIN UNLOADER FOR PARTICULATE MATERIAL

BACKGROUND OF THE INVENTION

1. Field of the Invention

The present invention relates to flail chain unloaders for discharging particulate material from the lower outlet of an upright storage vessel and, more particularly, to an unloader of the character described which is suitable for use with relatively fine or small sized particulate type of materials stored in an upwardly extending storage vessel and which materials are free-flowing and do not tend to bridge, form open pockets or a void in the region around the unloader while the unloader is in a stationary or inoperative condition.

2. Description of the Prior Art

Flail chain type unloaders have long been used for discharging silage material from upright agricultural silos and these type of unloaders employ swinging flail chains attached to an upright, centrally located, rotating shaft at succeeding spaced apart levels with ever increasing chain lengths until reaching a maximum length chain having an outer end movable in a path closely adjacent an inside wall surface of the silo. Additional upper flail chains of shorter length may normally be provided and spaced above the maximum length chains in order to dig out a crown-shaped bridge or roof of an open space in the silage mass at the bottom of the silo around the unloader. The silage bridge above the unloader permits the silage to move slowly downwardly into the path of the flail chains during an unloading operation. When the unloader is shut down, the silage normally tends to remain in a bridged condition providing a somewhat open pocket or void around the unloader so that when the unloader is again started by rotation of the shaft, the flail chains of varying lengths can move upwardly after becoming disentangled from one another and out of the hanging or rest position to occupy a normal operating horizontal position wherein the chains eat away or cut away a bottom layer of the silage bridging across the silo so that the entire mass of silage above the unloader moves slowly down as the unloading operation proceeds.

Typical prior art flail chain unloaders for silage in agricultural silos are disclosed in U.S. Pat. Nos. 3,907,131; 3,142,656 and 4,079,848, which patents are assigned to the same assignee as the present application, and which patents are incorporated herein by reference. These type of silage unloaders may be unsuitable for use with relatively fine and/or free-flowing particulate materials such as agricultural grains, wood chips, plastic beads, meat meal, fish meal, etc., which commodities are oftentimes stored in upright silos or vessels for commercial operations. In general, freely flowable materials stored in commercial and industrial silos such as sand and granular materials tend to flow more easily than stringly silage material and these free-flowing particulates tend to fill up a lower portion of the vessel surrounding the flail chain type unloader when stopped so that thereafter, upon initial start up of the unloader for the purpose of discharging material from the storage vessel, the elongated flail chains and particularly the longer ones at the upper levels, are often unable to become disentangled from the progressively shorter chains therebelow and ineffective discharge results. Sometimes the longer chains never become disentangled enough to move outwardly into the normal horizontally extending operating position for digging out and dislodging the material to flow downwardly into the discharge opening.

Attempts at using conventional types silage unloaders having chain lengths as illustrated in the foregoing patents for free-flowing particulates have sometimes been unsuccessful because of the inability of the upper, longer unloader chains to become disentangled from lower chains during initial start up.

OBJECTS OF THE INVENTION

It is therefore an object of the present invention to provide a new and improved flail chain unloader for discharging free-flowing particulate materials from upright storage vessels and the like and more particularly, it is an object of the present invention to provide a flail chain type unloader of the type descrived in which the flail chains do not exhibit the tendency to remain in entanglement during an operating cycle.

Yet another object of the present invention is to provide a new and improved flail chain unloader for discharging materials from upright storage vessels and the like wherein a set of relatively short length chains is attached to an upright shaft of the unloader at levels below one or more maximum length chains which have outer ends closely approaching the inside wall of the storage vessel whereby the maximum length chains more rapidly become free of entanglement with lower chains during an initial start up of an unloading operation when the shaft begins to rotate.

Still another object of the present invention is to provide a new and improved flail chain type unloader of the character described which is extremely efficient in operation and which is useful for a wide variety of different types of particulate materials commonly stored in upright commercial storage vessels or silos.

Still another object of the present invention is to provide a new and improved flail chain unloader mounted in upright storage vessels for use in unloading generally free-flowing materials contained therein such as agricultural grain, meat meal, fish meal, plastic beads. pellets, wood chips, sand, and a variety of other materials used in commercial operations.

BRIEF SUMMARY OF THE INVENTION

The foregoing and other objects and advantages of the present invention are accomplished in a new and improved flail chain unloader for discharging relatively free-flowing particulate material from a lower outlet of an upright storage vessel. The unloader includes a rotatable shaft mounted upright on a central axis in the vessel and the shaft extends above a lower discharge outlet therein. A plurality of flexible flail chains are secured to the upright shaft at spaced apart levels and at least one upper flail chain of a maximum length is secured adjacent an upper level of the shaft and has an outer end which is movable in a generally circular path or orbit that is closely adjacent an inside wall surface of the vessel when the shaft is rotated. Beneath the maximum length flail chain is provided a set of relatively short, intermediate level flail chains secured at progressively lower levels on the shaft and these intermediate flail chains are substantially shorter in length for the purpose of digging out and loosening the material in close vicinity to the shaft during initial start up and for minimizing entanglement between these intermediate chains and the downwardly hanging upper chains of maximum length. With this arrangement, after start up commences, all of the chains rapidly become free and disentangled from one another and thereafter efficiently function to dig out and loosen up the material to flow freely downwardly towards the discharge outlet at a lower level in the vessel. After an unloading operation has been completed, the flail chains move to a downwardly hanging rest position as shaft rotation ceases and the relatively free-flowing material stored in the vessel tends to fill in closely around the chains. During the next start up of shaft rotation, this fill-in material tends to impede outward movement of the chains toward their normally efficient, horizontally disposed circular orbits. By providing a set of relatively short length intermediate chains below the level of the maximum length upper chains, continued entanglement between the downwardly hanging chains during initial start up phases of an unloading operation is minimized so that an efficient, full capacity discharge flow of material is rapidly attained, even when free-flowing types of materials are involved.

BRIEF DESCRIPTION OF THE DRAWINGS

For a better understanding of the present invention, reference should be had to the following detailed description taken in conjunction with the drawings, in which.

DETAILED DESCRIPTION OF THE PRESENT INVENTION

Figure 2:
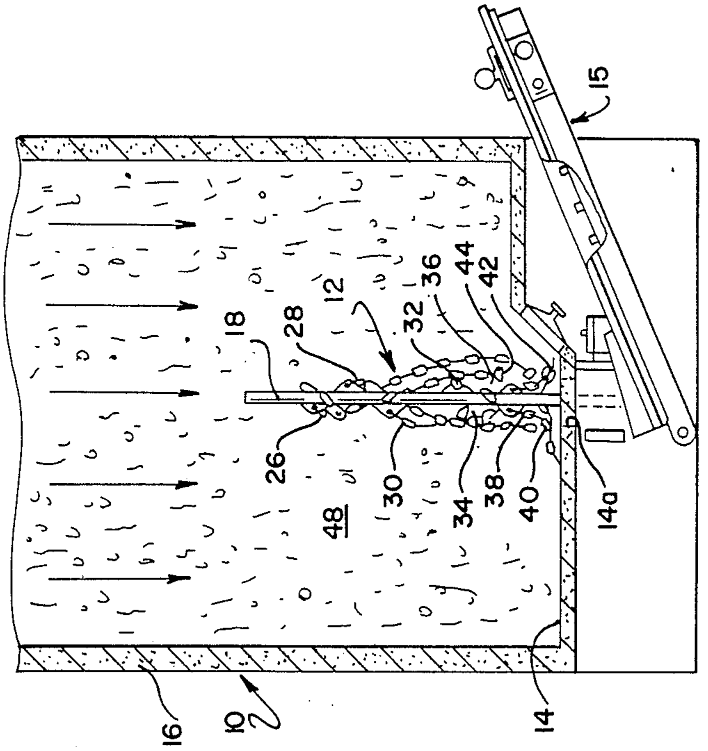
FIG-2- PRIOR ART
FIG. 2 is a transverse, cross-sectional view similar to FIG. 1 showing a storage vessel with free-flowing material contained therein instead of silage and illustrating a prior art silage unloader in an inoperative condition wherein the chains hang downwardly and become entangled with one another, and are then surrounded by fill-in material making disentanglement relatively difficult when the next start up for a discharge operation is commenced.
Figure 1:
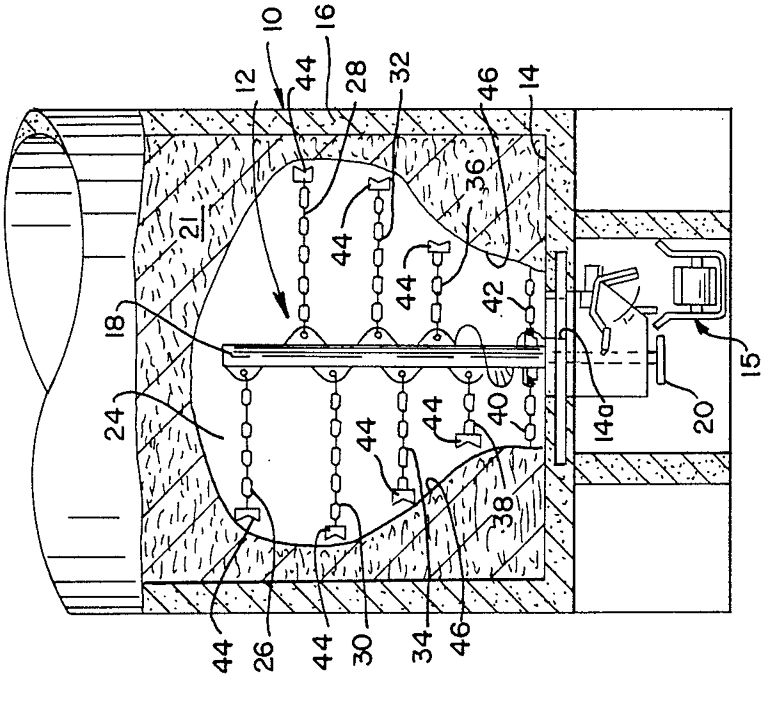
FIG-1- PRIOR ART
FIG. 1 is a transverse, cross-sectional view taken on a vertical plane extending upwardly through a central axis of a typical silo having a flail chain type unloader for discharge of the silage therein and shown in an operative condition clearly disclosing the relative lengths of the flail chains attached to an upright shaft.

Referring now to FIGS. 1 and 2, therein is illustrated a typical upright storage vessel or silo 10 employing a prior art flail chain type unloader 12 for unloading silage material 21 from the vessel to flow downwardly through an outlet opening 14*a* in a bottom wall 14 for discharge onto a belt conveyor 15 or the like used for loading the discharged material into containers, vehicles, etc., for transport or feed troughs or the like (not shown).

The upright vessel 10 includes a generally cylindrical sidewall 16 projecting upwardly from the circular bottom wall 14 and the flail chain type unloader 12 includes an upright rotatable shaft 18 at the center of the vessel 10 along a vertical axis. When it is desired to unload the silage material 21 from the storage vessel 10, the flail chain unloader 12 is energized to drive the rotating shaft 18, which shaft is powered by a drive mechanism 20 mounted below the bottom wall 14 and drivingly connected to a lower end portion of the rotating shaft 18.

Referring specifically to FIG. 1, the flail chain unloader 12 is designed for discharging the tough, stringy, silage material 21 stored in the upright vessel 10 and the silage material tends to bridge across the vessel sidewall 16 forming a crowned lower end of the silage mass at a level just above the flail chain unloader 12. The bridging action of the stringy silage material 21 tends to form an open pocket or void space 24 that completely surrounds the flail chain unloader 12 when the chains thereof are driven to rotate in circular paths or orbits around the center of the vessel 10 at spaced apart levels above the bottom wall 14.

As illustrated, the flail chain unloader 12 includes a plurality of flail chains 26, 28, 30, 32, 34, 36, 38, 40 and 42 attached alternately to opposite sides of the rotating shaft 18 and the uppermost chain 26 is dimensioned with a length less than the maximum length chains 28 and 30 which have outer end cutters 44 movable in circular paths closely adjacent the inside surface of the vessel sidewall 16 so as to cut away the edge material moving downwardly in the silo so that the loosened silage falls freely downwardly and moves towards the central opening 14*a* for discharge.

Below the maximum length flail chain 28, the flail chains 30, 32, 34, 36 and 38 are progressively shorter in length to form a downwardly sloping, conically-shaped wall or funnel of silage material 21 (designated by the numeral 46). This generally frustroconically-shaped funnel surface 46 remains substantially in place once formed and acts as a discharge funnel directed towards the outlet opening 14*a* for the material that is dislodged from the dome-shaped upper surface of the void area 24. The silage mass has a thin, peripheral edge portion around the inside surface of the cylindrical sidewall 16 and the cutters 44 on the chains 28 and 30 cut away this edge portion away allowing the silage mass above to slip slowly downwardly on the wall 16 of the vessel 10 as unloading proceeds.

Because silage material is normally tough and stringy, silage has a great tendency to bridge and form a self-supporting dome-like undersurface beneath the large mass of silage 21 contained within the vessel 10 above the unloader 12, the open space 24 tends to remain intact and substantially free of silage material even when rotation of the flail chain unloader 12 is stopped. Later on when rotation is again commenced for the discharge of additional silage material 21, the flail chains are readily untangled from one another from their hanging positions at rest, as shown in FIG. 2 because there is little or no interference from silage material 21 within the normally open space or void 24 below the large mass of silage material extending upwardly thereof.

FIG. 2 schematically represents the use of a prior art type flail chain unloader 12 in a storage vessel 10 which is used for the handling and storage of freely flowable, and/or fine or small size, particulate material 48 such as agricultural grains, meat meal, fish meal, wood chips, plastic pellets and a wide variety of other relatively free-flowing commercial materials often used in manufacturing operations. Because such materials are free-flowing, the mass of such material stored in the vessel 10 above the flail chain unloader 12 tends to flow and completely fill in the space immediately around the flail chain unloader 12 whenever the unloader is not in operation. This occurs whenever the individual flail chains 26, 28, 30, 32, 34, 36, 38, 40 and 42 are hanging downwardly at a rest position and the chains tend to become easily entangled with one another around the upstanding shaft 18. When it is desired to commence a discharge operation and the shaft 18 is initially rotated, the flail chains do not readily become disentangled because of the interference from the free-flowing material 48 occupying the previous void 24 or space immediately surrounding the flail chains and the shaft 18. Accordingly, the discharge or unloading is substantially impeded and/or extremely inefficient at best when using a prior art type flail chain unloader 12 which has chain lengths specifically designed for use with bridging type, stringy materials such as silage 21.

Figure 3:
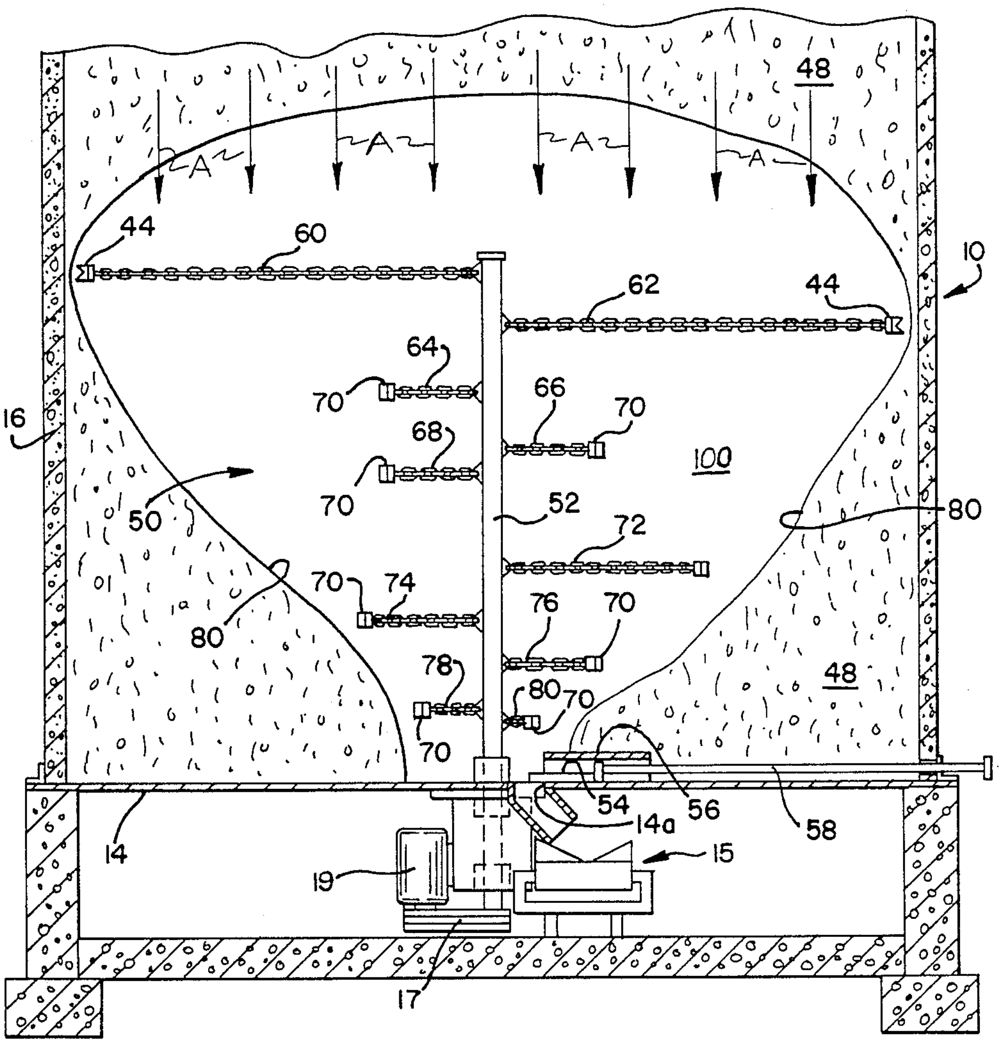
FIG. 3 is an elevational, cross-sectional view taken on a vertical plane through a central portion of a storage vessel having a new and improved flail chain unloader in accordance with the present invention shown in an operating condition so that the relative length of the chains can be seen during a discharging operation wherein the upright central shaft is at full rotational speed.

In accordance with the present invention, a new and improved flail chain type unloader 50 is illustrated in FIGS. 3-6 of the drawings and the flail chain unloader 50 includes an upstanding rotatable shaft 52 centered in the vessel 10 within the cylindrical sidewall 16 and projecting upwardly of a bottom wall 14 having a discharge opening **14*a* adjacent a central portion thereof. The rotating shaft 52 extends downwardly through a central opening in the circular bottom wall 14 and is drivingly interconnected with a gear motor 19 through a belt or chain drive 17 as illustrated in FIG. 3. Whenever the gear motor 19 is energized, the shaft 52 begins to rotate about a central vertical axis in the storage vessel 10 within a mass of relatively fine, free-flowing particulate material 48 stored therein. As the flail chains of the unloader 50 begin to swing outwardly, the material 48 is loosened from the mass and flows downwardly toward the discharge opening 14*a* into an awaiting container or a conveyor 15** as the case may be.

Figure 5:
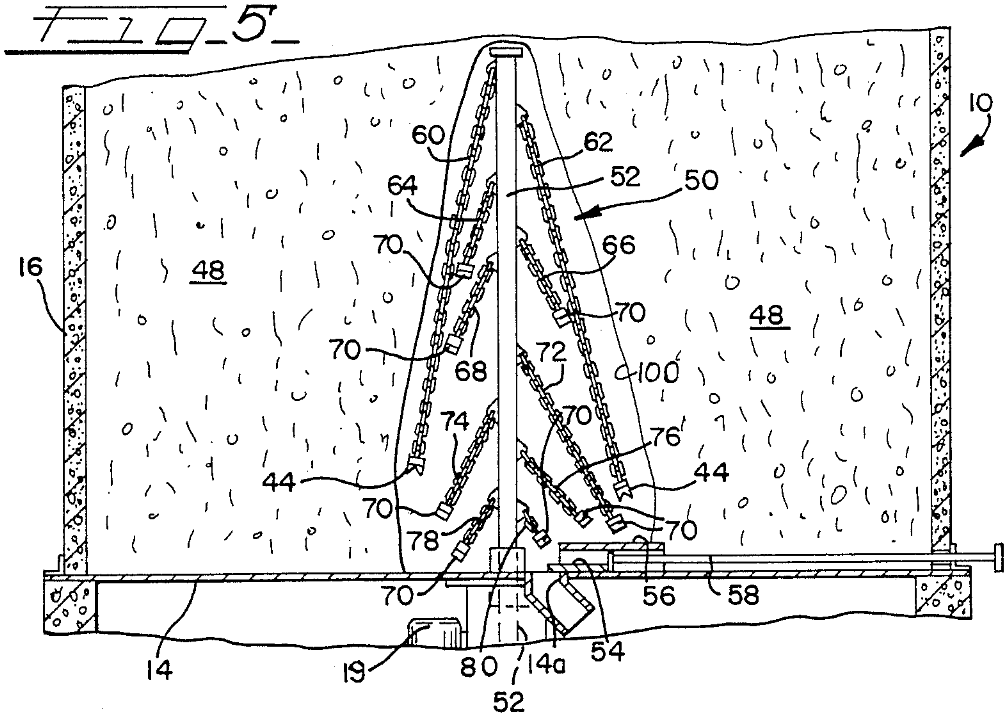
FIG. 5 is a cross-sectional view similar to FIG. 4 illustrating the flail chains of the unloader in an intermediate position shortly after the initial start up of rotation has been commenced for an unloading operation.
Figure 6:
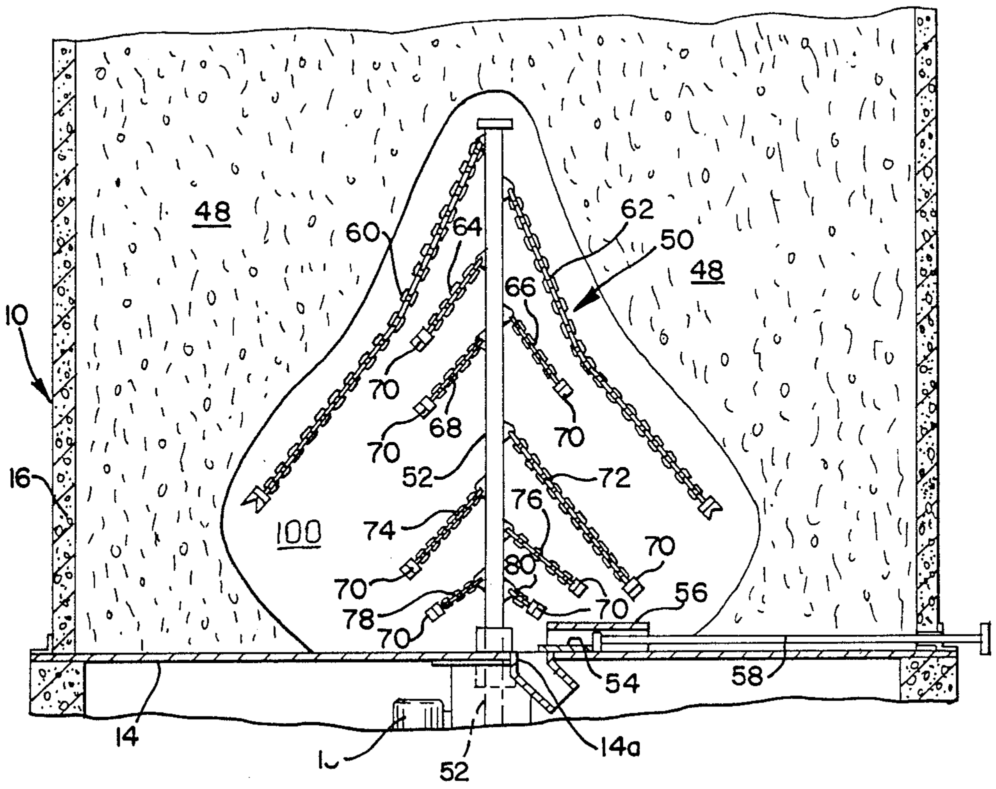
FIG. 6 is a cross-sectional view of the flail chain unloader of the present invention similar to FIG. 5 but illustrating the flail chains at a subsequent point in time during the start up phase of operation wherein the flail chains have become substantially free of one another and are moving rapidly outwardly into the material for digging out and loosening the material for discharge downwardly toward an outlet in the bottom of the storage vessel.

For controlling the rate of discharge of the material 48, a slidable gate 54 is mounted for sliding movement in a gate housing 56 provided on the bottom wall 14 adjacent the outlet **14*a*. Movement of the gate to open or close the discharge outlet 14*a* is controlled by a push rod 58 and the position of the gate relative to the outlet regulates the flow rate of material 48 through the outlet opening whenever the gate is positioned in a fully open or partially open position as illustrated in FIGS. 3, 5 and 6**.

In accordance with the present invention, the flail chain unloader 50 includes a plurality of maximum length, upper flail chains 60 and 62 attached to an upper end portion of the centrally aligned, vertical supporting shaft 52 and these chains have cutters 44 attached at the outer ends which move in a circular, horizontal path or orbit closely adjacent to the inside cylindrical wall surface of the vessel sidewall 16 when the drive shaft 52 is rotating at full speed in a mass of free-flowing material 48 as illustrated in FIG. 3. Preferably, the upper two flail chains 60 and 62 are substantially equal in length but the chain 62 is spaced downwardly on the shaft 52 a distance below the uppermost, maximum length flail chain 60.

In accordance with the invention, the unloader 50 includes a plurality of relatively short length, intermediate level chains 64, 66 and 68 and these chains are attached to the shaft 52 at vertically spaced intervals below the level of the upper level chains 60 and 62. Preferably, the intermediate, short length chains 64, 66 and 68 are of equal length and each is provided with a channel-shaped material dislodging element 70 attached at the outer end for digging out material 48 from a central mass thereof around the rotating shaft 52.

At levels below the intermediate flail chains 64, 66 and 68, the unloader 50 is provided with a lower set of flail chains including a topmost lower chain 72 having a length somewhat greater than the intermediate level, relatively short length chains 64, 66 and 68. The lower level set of flail chains includes the uppermost chain 72 in the set and lower chains 74, 76, 78 and 80 which are progressively shorter in length at each lower level on the shaft 52.

Figure 4:
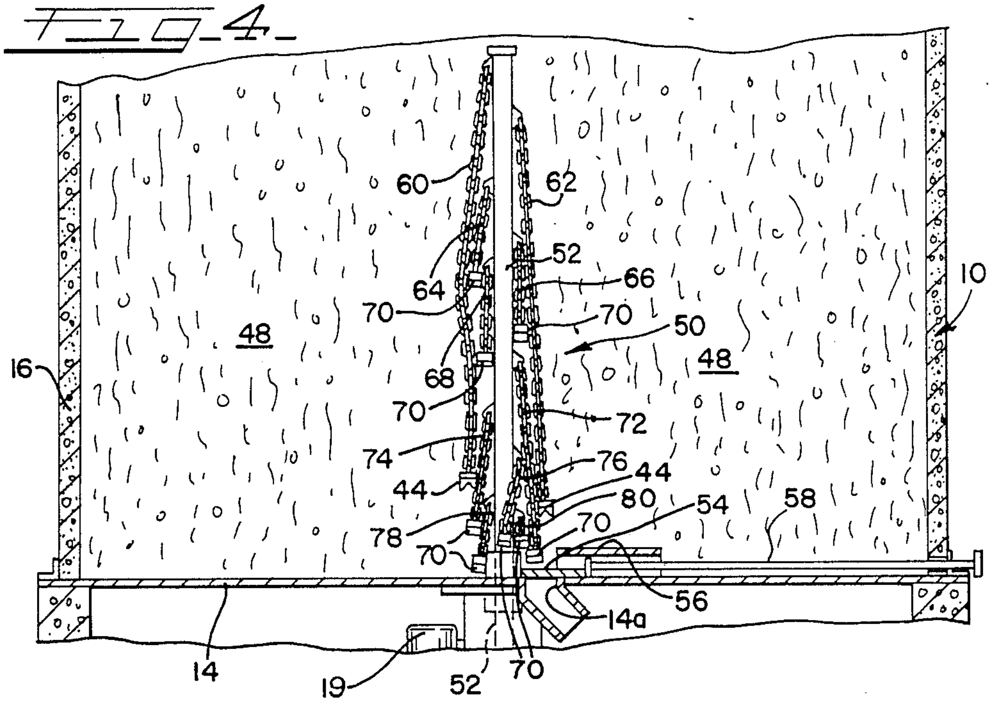
FIG. 4 is a cross-sectional view of the storage vessel and flail chain unloader of FIG. 3 but showing the unloader in an inoperative, or rest condition wherein the flail chains hang downwardly along the upright shaft and sometimes become entangled because of the free-flowing fill-in of material around the shaft which tends to leave little if any open area for the chains to move freely outwardly as rotation of the shaft is initially commenced.

Referring now to FIG. 4, when the flail chain unloader 50 is not in operation, the free-flowing particulate material 48 in the vessel 10 tends to fill-in the space or void immediately around the upright shaft 52 and the material completely surrounds the downwardly hanging chains which are at rest. In clear distinction with respect to silage material 21 (FIG. 1) which tends to bridge or form a dome wall above the flail chain unloader 12, the free-flowing material 48 flows into the region around the unloader 50 whenever the unloader is at rest, but does not pack tightly enough to provide sufficient resistance to the rapid disentanglement of the chains when rotation of the shaft 52 commences, and this occurs because of the unique chain length sizes and spacing intervals of the unloader 50 which minimize chain entanglement and which promote rapid disentanglement when shaft rotation commences.

As shown in FIG. 2, the mass of free-flowing material 48 closely adjacent to the shaft 18 tends to retard somewhat the outward movement of the chains as the shaft initially begins to rotate and the longer upper level chains tend to remain entangled, especially in unloaders 12 having chain lengths in accordance with the prior art as shown in FIGS. 1 and 2. However, in accordance with the unloader 50 of the present invention (FIGS. 3, 4, 5 and 6), the intermediate level, short length chains 64, 66 and 68 (spaced below the maximum length upper level chains 60 and 62) do not normally become sufficiently entangled with the upper level chains, so as to long retard the movement of the upper chains outwardly thereof when shaft rotation initially commences. Moreover, the short, intermediate level chains 64, 66 and 68 tend to rapidly dig out and loosen the fill-in material 48 immediately surrounding the shaft 52 so that the longer upper level chains 60 and 62 can rapidly begin to move outwardly and become completely free of entanglement as illustrated in FIG. 5 as the rotational speed of the shaft 52 picks up. This trend continues and all of the chains begin to slope upwardly and outwardly of the central shaft 52 as rotational speed continues to increase. Moreover, because the intermediate level chains 64, 66 and 68 are of relative short length, there is minimal entanglement of these intermediate level chains with the lower level set of chains even though the lower level chains 72 and 74 of the lower set are longer than the intermediate level chains 64, 66 and 68.

As rotational speed of the shaft 52 continues to pick up, the lower level chains 72, 74, 76, 78 and 80, begin to move upwardly and outwardly as the material 48 adjacent the central shaft is dug out and a central opening or void space 100 formed around the shaft 52 begins to enlarge in size as illustrated in FIGS. 3, 5 and 6. Finally, when the shaft 52 reaches full speed, all of the rotating chains reach the fully extended generally horizontal operating position as shown in FIG. 3, the area or void space 100 around the flailing chains reaches a maximum size and is continuously swept relatively clean of the material 48. As this occurs, the large mass of material 48 above the level of the unloader 50 moves slowly downwardly in the sidewall 16 of the vessel 10 as illustrated by the arrows A in FIG. 3. The whirling flail chains dislodge the material 48 which flows downwardly toward the discharge opening 14a along a funnel-shaped path formed by the slope angle of repose of the material itself as designated by the reference numeral 80 in FIG. 3.

In accordance with the present invention, flail chain unloaders 50 with sets of flail chains at the upper levels, intermediate levels and lower levels as described herein, have been successfully used for unloading storage vessels 10 at a precisely controlled rate of discharge with relatively fine, free-flowing materials such as wood chips, meat meal, bone meal, fish meal, agricultural grains, plastic pellets, sand and gravel, etc.

A typical flail chain unloader 50 installed in a storage vessel 10 having an internal diameter of 30 feet has been built and successfully tested. The unloader included a pair of upper level chains 60 and 62 having a length of 174 inches spaced at levels of 192 and 179 inches above the bottom wall 14. A set of intermediate level chains 64, 66 and 68, each being 36 inches in length were attached to the shaft 52 at the 152 inch, 128 inch and 119 inch levels above the bottom wall 14. A lower set of flail chains 72, 74, 76, 78 and 80, respectively, dimensioned with progressively shorter chain lengths of 75 inches, 53 inches, 36 inches, 20 inches and 18 inches at respective lower levels of 80 inches, 58 inches, 40 inches, 24 inches and 16 inches, above the bottom wall 14 were attached to the shaft 52.

The unloader 50 having chain lengths as aforesaid, has been successfully used with a wide variety of materials without substantial entanglement of the flail chains during initial start up and the time period immediately following until full speed rotation of the shaft 52 is attained. This phenomena has occurred even though free-flowing materials 48 that were involved tend to flow closely in and around the drive shaft 52 during any inoperative periods of the unloader 50.

Many modifications and variations of the present invention are possible in light of the foregoing specification and thus, it is to be understood that within the scope of the appended claims, the invention may be practiced otherwise than as specifically described.

What is claimed and desired to be secured by Letters Patent of the United States is:

1. An unloader for discharging particulate material from a lower outlet of an upright storage vessel, comprising:

rotating shaft means mounted in said vessel adjacent a central portion thereof projecting upwardly of said lower outlet; and flail means secured to said shaft means for rotation therewith to loosen said particulate materials contained in said vessel to flow downwardly for discharge through said lower outlet;

said flail means including a plurality of flail chains secured at their inner ends to said shaft means at spaced apart levels above said bottom outlet;

said plurality of flail chains comprises at least one upper flail chain of maximum length secured to said shaft means adjacent an upper level of said shaft means having an outer end movable in a generally circular path closely adjacent an inside wall surface of said vessel;

at least one set of lower flail chains secured to said shaft means at spaced apart ever increasing levels above said bottom outlet, said lower set of flail chains including a lowermost chain of minimum length and at least one other lower flail chain spaced above said lowermost chain having a greater length than said minimum length chain of said lower set of flail chains, said set of lower flail chains having lengths substantially less than said upper flail chain and increasing in length at each higher level in said set to generally match the angle of repose of said material in said vessel; and at least one intermediate flail chain secured to said shaft means at a level spaced between said upper flail chain and said lower set of flail chains, said intermediate flail chain having a length substantially less than said upper flail chain and less than a lower flail chain of said set immediately therebelow for minimizing entanglement between said chains and movement of said upper flail chain from a downwardly hanging, at rest position, toward an outwardly extended position away from said shaft means and other flail chains upon initial rotation of said shaft means for discharging material from said vessel.

2. The unloader of claim 1, wherein:

said flail means includes a plurality of said upper flail chains attached at different levels adjacent an upper end portion of said shaft means.

3. The unloader of claim 2, wherein:

said upper flail chains are substantially equal in length.

4. The unloader of claim 1, wherein:

said upper flail chain includes a material cutter mounted adjacent an outer end for cutting and removing said material that is packed against said inside wall surface of said vessel.

5. The unloader of claim 1, wherein:

said flail means includes a plurality of said intermediate flail chains attached at different levels to said shaft means spaced below said upper flail chain.

6. The unloader of claim 5, wherein:

said intermediate flail chains are substantially equal in length.

7. The unloader of claim 6, wherein:

said intermediate flail chains include material dislodging means on the outer end for loosening up said material adjacent a central core portion of said vessel while said shaft means rotates.

8. The unloader of claim 1, wherein:

said upper flail chain is approximately four times or more longer than said intermediate flail chain adjacent therebelow.

9. The unloader of claim 8, wherein:

said upper flail chain and said intermediate flail chain are secured on opposite sides of said shaft means.

10. The unloader of claim 5, wherein:

said intermediate flail chains are secured on opposite sides of said shaft means.

11. An unloader for discharging particulate material from a lower outlet of an upright storage vessel, comprising:

rotating shaft means mounted in said vessel adjacent a central portion thereof projecting upwardly of said lower outlet;

flail means secured to said shaft means for rotation therewith to loosen said particulate materials contained in said vessel to flow downwardly for discharge through said lower outlet;

said flail means including a plurality of flail chains secured at their inner ends to said shaft means at spaced apart levels above said bottom outlet;

said plurality of flail chains comprises at least one upper flail chain of maximum length secured to said shaft means adjacent an upper level of said shaft means having an outer end movable in a generally circular path closely adjacent an inside wall surface of said vessel;

at least one set of lower flail chains secured to said shaft means at spaced apart ever increasing levels above said bottom outlet, said lower set of flail chains including a lowermost chain of minimum length and at least another lower flail chain spaced above said lowermost chain having a length greater than said minimum, said lower set of flail chains having lengths substantially less than said upper flail chain and increasing in length at each higher level in said set to generally match the angle of repose of said material in said vessel;

at least one intermediate flail chain secured to said shaft means at a level spaced between said upper flail chain and said lower set of flail chains, said intermediate flail chain having a length substantially less than said upper flail chain and less than an upper one of said set of lower flail chains for minimizing entanglement with upper flail chain when rotation of said shaft means is initiated; and rotary power means for turning said shaft means at a speed sufficient to move said upper chain through said material from a downwardly hanging, rest position to an outwardly extending rotative position away from entanglement with said intermediate flail chain and said lower flail chains of said set when said power means is energized to initially start up rotation of said shaft means.

12. The unloader of claim 11, including:

a plurality of said intermediate flail chains secured to said shaft means at spaced apart levels between said upper flail chain and said set of lower flail chains.

13. The unloader of claim 12, wherein:

said intermediate flail chains are substantially equal in length.

14. The unloader of claim 13, including:

a plurality of said upper flail chains attached at different levels adjacent an upper end portion of said shaft means.

15. The unloader of claim 14, wherein:

said upper flail chains are substantially equal in length.

16. The unloader of claim 15, including:

material dislodging means attached adjacent outer ends of said flail chains.

17. The unloader of claim 16, wherein:

said material dislodging means includes pointed cutter elements mounted on said upper flail chains for dislodging said material backed adjacent an inside wall surface of said vessel.

18. The unloader of claim 17, wherein:

said material dislodging means includes channel shaped elements mounted on said flail chains spaced below said upper flail chains.

* * * * *